United States Patent
Su et al.

(10) Patent No.: US 10,101,962 B2
(45) Date of Patent: Oct. 16, 2018

(54) USER INPUT THROUGH TRANSDUCER

(71) Applicant: Cirrus Logic International Semiconductor Ltd., Edinburgh (GB)

(72) Inventors: Jie Su, Austin, TX (US); Rong Hu, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 15/195,192

(22) Filed: Jun. 28, 2016

(65) Prior Publication Data

US 2017/0371616 A1    Dec. 28, 2017

(51) Int. Cl.
  *G06F 3/16*   (2006.01)
  *G06F 3/041*  (2006.01)
  *H04R 29/00*  (2006.01)

(52) U.S. Cl.
  CPC .............. *G06F 3/165* (2013.01); *G06F 3/041* (2013.01); *G06F 3/167* (2013.01); *H04R 29/001* (2013.01)

(58) Field of Classification Search
  CPC .......... G06F 3/041; G06F 3/165; G06F 3/167; H04R 29/001; H04R 2499/11
  See application file for complete search history.

(56) References Cited

U.S. PATENT DOCUMENTS

| | | | |
|---|---|---|---|
| 4,975,963 A * | 12/1990 | Liberman | H03F 1/305 381/83 |
| 6,545,612 B1 | 4/2003 | Lindgren et al. | |
| 9,161,126 B2 | 10/2015 | Su et al. | |
| 9,173,027 B2 | 10/2015 | Su | |
| 2006/0211499 A1* | 9/2006 | Bengtsson | G06F 1/1626 463/47 |
| 2010/0098261 A1 | 4/2010 | Norhammar et al. | |
| 2011/0037734 A1* | 2/2011 | Pance | G06F 3/016 345/177 |
| 2012/0020488 A1 | 1/2012 | Huijser et al. | |
| 2013/0051567 A1 | 2/2013 | Gipson | |
| 2013/0133431 A1 | 5/2013 | Manabe et al. | |
| 2014/0270208 A1 | 9/2014 | Miller et al. | |
| 2014/0328488 A1* | 11/2014 | Caballero | H04R 3/00 381/58 |

(Continued)

FOREIGN PATENT DOCUMENTS

| EP | 2271134 A1 | 1/2011 | |
|---|---|---|---|
| EP | 2945398 A1 | 11/2015 | |
| WO | WO 2006075275 A1 * | 7/2006 | ............. G01H 11/00 |

*Primary Examiner* — Mark Fischer
(74) *Attorney, Agent, or Firm* — Norton Rose Fulbright US LLP

(57) ABSTRACT

Commands for modifying audio playback, such as to mute and unmute or pause and play audio, may be input to a mobile device by a user through interacting with the speaker in the device. The user input may be facilitated by monitoring a characteristic of the speaker and identifying signatures in the changing characteristics of the speaker that correspond with predetermined user activities. For example, a resonance frequency of the speaker may be monitored for a change resulting from a user placing a hand to cover the speaker output. When the resonance frequency change is detected, the audio playback may be muted. The speaker may continue to be monitored for a change indicating removal of the user's hand, and then audio playback may be unmuted.

21 Claims, 8 Drawing Sheets

(56) References Cited

U.S. PATENT DOCUMENTS

| | | | |
|---|---|---|---|
| 2015/0030167 A1* | 1/2015 | Pan | H04R 3/007 381/59 |
| 2015/0030169 A1* | 1/2015 | Pan | H04R 29/001 381/59 |
| 2015/0110324 A1* | 4/2015 | Feng | H04R 1/028 381/334 |
| 2015/0198986 A1* | 7/2015 | Chang | G06F 1/26 713/330 |
| 2016/0323673 A1* | 11/2016 | Peng | H04R 9/06 |
| 2016/0345113 A1* | 11/2016 | Lee | G01S 15/04 |

* cited by examiner

USER INPUT THROUGH TRANSDUCER

FIELD OF THE DISCLOSURE

The instant disclosure relates to electronic devices. More specifically, portions of this disclosure relate to receiving user input through a speaker of the electronic device.

BACKGROUND

Mobile devices provide interactive experiences for users by receiving user input commands and responding to those commands. Receiving user input on a mobile device can be challenging, as the small size of the mobile device can restrict options for interacting with the user. A user's approval, and subsequent purchase decisions, rests largely on whether their interaction with the mobile device is pleasant, intuitive, and simple. Conventionally on a mobile device nearly all interaction with a user occurs through a touch screen display integrated with the mobile device. Although touch screens may be useful for presenting complex information and a large number of options in a programmable manner, the information display and user interface may be difficult to navigate to get to a particular command. For example, to mute audio during a call or music playback, a user often needs to remove the mobile device from his pocket, power on the display, enter a password to operate the device, swipe down from the top of the screen to access a settings display, and then tap a mute button. Such an operation is needlessly complex. Some solutions to this problem may include building dedicated hardware buttons into the mobile device, such as a mute switch. However, mobile devices are continuing to shrink in dimensions, including thickness, and physical switches can be difficult to fit into a small mobile device, integrate with a casing to provide water resistance for the device, and/or achieve desired aesthetics of the device.

Shortcomings mentioned here are only representative and are included simply to highlight that a need exists for improved electrical components, particularly for receiving user input in consumer-level devices, such as mobile phones. Embodiments described herein address certain shortcomings but not necessarily each and every one described here or known in the art.

SUMMARY

Some components of a mobile device may be used as alternative means for providing user input to the mobile device and/or control operation of the mobile device. Any component in the mobile device that has a feedback signal for monitoring the component or conditions around the component may be used in this manner. In one embodiment, a transducer, such as a speaker, of a mobile device may provide feedback signals to a logic device, such as a processor, that can be used to detect user input. For example, a speaker monitoring circuit may provide voltage and/or current signals to the processor for monitoring the conditions of the speaker. A user may provide input by performing an action that deliberately alters the monitored characteristic of the speaker. A speaker's impedance and/or resonance frequency may be modified by placing an object in the radiation field of the speaker. In one embodiment, a speaker's resonance frequency may be modified by covering the housing of the speaker. The changes in the speaker characteristic may be determined by monitoring voltage and/or current signals from the speaker. When the characteristic of the speaker changes exhibits a change known to correlate with particular user behavior, the device may determine the user has input a command to the device. Some commands that may be issued to the mobile device through the speaker may include play, pause, fast forward, rewind, mute, unmute, or increase or decrease a volume of the audio.

After a first user input is provided to the device through the speaker, a second user input may be provided through the speaker. The device may wait for another change of a characteristic of the speaker or a return to a prior status of the previously-monitored characteristic. The second user input may be, for example, a follow-up action that reverses the first user input, such as a mute command followed by an unmute command. The second user input may be based on the same monitoring as monitoring for the first user input, or the second user input may be detected by monitoring for different conditions than those that indicate the first user input. In one embodiment, the processor may detect a first user input of covering of the speaker and respond by muting the speaker, then the processor may wait to detect taps on the speaker and respond by unmuting the speaker. In some embodiments, both the first user input and the second user input may modify the same characteristic of the speaker, but in other embodiments different characteristics may be modified. For example, the covering of the speaker as part of the first user input may modify the resonance frequency of the speaker, whereas the tapping of the speaker as part of the second user input may modify the voltage and/or current at the speaker.

According to one embodiment, a method may include detecting a user input through a transducer (such as a partial or complete coverage of a transducer) while the transducer is outputting audio by monitoring a characteristic (such as a voltage, current, or resonance frequency) of the transducer, and then performing a first action that modifies the audio being output through the transducer based, at least in part, on detecting the user input received through the transducer. The action performed may include an action that modifies the audio such as by muting the audio, pausing playback, fast forwarding, rewinding, and/or changing a volume of the audio. In certain embodiments, the method may include detecting coverage by monitoring at least one of a voltage across the transducer and a current through the transducer, monitoring the resonance frequency of the transducer for an increase in resonance frequency by at least a threshold amount, and/or monitoring the resonance frequency of the transducer for an increase in resonance frequency to above 1 kilohertz. In some embodiments, any of these methods or variations thereof may be performed by an apparatus having a controller coupled to a transducer and configured with hard-wired circuitry, firmware, and/or software to perform the steps of the method.

In some embodiments, the method may also include detecting a command and performing a second action. For example, the method may include detecting a second user input through the transducer to perform a second action after performing the first action, and then performing a second action that modifies the audio being output through the transducer based, at least in part, on detecting the second user input. The detection of the second user input may include monitoring a voltage and/or a current through the transducer, detecting a double-tap on the transducer, outputting inaudible signals through the transducer after performing the first action, and/or detecting an uncovering of the transducer. The apparatus having a controller described above may also be configured to perform any of these additional functions.

According to another embodiment, an apparatus may include a transducer; at least one analog-to-digital converter (ADC) coupled to the transducer; and a processor coupled to the transducer and coupled to the at least one analog-to-digital converter (ADC). The processor may be configured, such as through firmware or software code, to perform certain steps in interacting with a user and controlling the transducer or other aspects of a device containing the processor, such controlling audio software on a mobile device. In some embodiments, the processor may be configured to perform steps including receiving data regarding the transducer from the at least one analog-to-digital converter (ADC); detecting user input (such as a partial or complete coverage) of a transducer of a device while the transducer is outputting audio by calculating a characteristic (such as voltage, current, impedance, or resonance frequency) of the transducer based, at least in part, on the received data from the at least one analog-to-digital converter (ADC); and performing a first action that modifies the audio being output through the transducer based, at least in part, on detecting the user input received through the transducer. The apparatus may also include an amplifier coupled to the processor and to the transducer, in which the amplifier may be controlled by the processor to mute and unmute audio output or perform other actions that modify the audio output to the transducer. The apparatus may also include a switch coupled to the processor and to the transducer, in which the switch may be toggled to mute and unmute audio output or perform other actions that modify the audio output to the transducer.

In some embodiments, the processor may be further configured to detect another command and perform a second action. For example, the processor may be configured to perform steps including receiving second data regarding the transducer from the at least one analog-to-digital converter (ADC); detecting a second user input through the transducer to perform a second action based, at least in part, on the second data after the step of performing the action that modifies the audio; and/or performing the second action that modifies the audio being output through the transducer based, at least in part, on detecting the second user input. The user indication may include a double-tap on the transducer or in the vicinity of the transducer that can be detected by identifying a particular signature in the second data received from the at least one ADC, such as spikes in a voltage and/or current signal from the transducer. The second user input may alternatively or additionally include uncovering the transducer. To aid in detecting the uncovering, the processor may be configured to output inaudible signals through the transducer after performing the first action that modifies the audio. The inaudible signals may be used by the processor to monitor current and/or voltage at the transducer and identify changes of the impedance of the transducer that indicate an uncovering of the transducer.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims.

Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
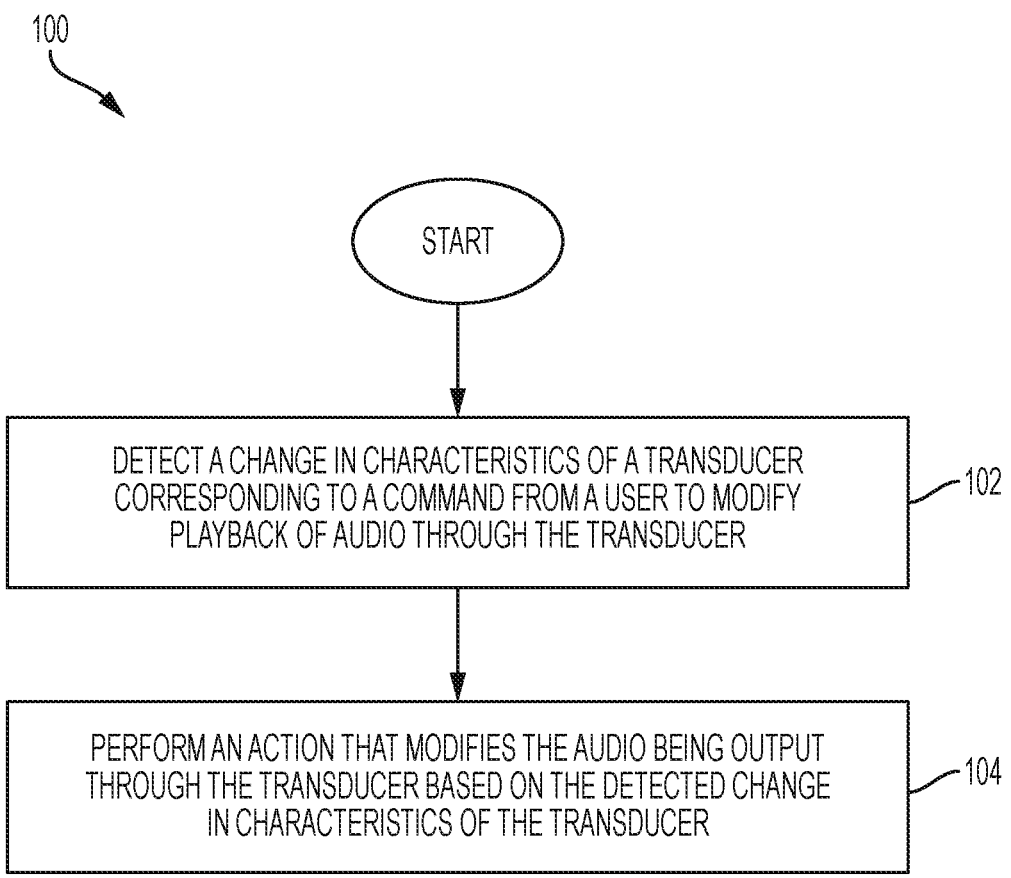
FIG. 1 is a flow chart illustrating an example method for interacting with a user by detecting user input through a transducer and performing an appropriate action according to one embodiment of the disclosure.

The transducer may be used as an input device for receiving user input and performing actions on a device that includes or is coupled to the transducer. The user input may be received by monitoring for changes in a characteristic of the transducer, such as voltage, current, impedance, or resonance frequency, and correlating the changes in the characteristic with a particular user activity intended to provide input to the device. FIG. 1 is a flow chart illustrating an example method for interacting with a user by detecting user input through a transducer and performing an appropriate action according to one embodiment of the disclosure. A method 100 may begin at block 102 with detecting a change in characteristics of a transducer corresponding to a command from a user to perform an action, such as to modify playback of audio, including music, sounds, or voices, through the transducer. In some embodiments, the change in characteristic may be detected through a monitoring circuit coupled to the transducer and configured to monitor the transducer, such as by monitoring a voltage across the transducer and/or a current through the transducer as audio is played through the transducer. Then, at block 104, in response to the detected change in characteristics of the transducer, an action may be performed, such as to modify the audio being output through the transducer.

Figure 2:
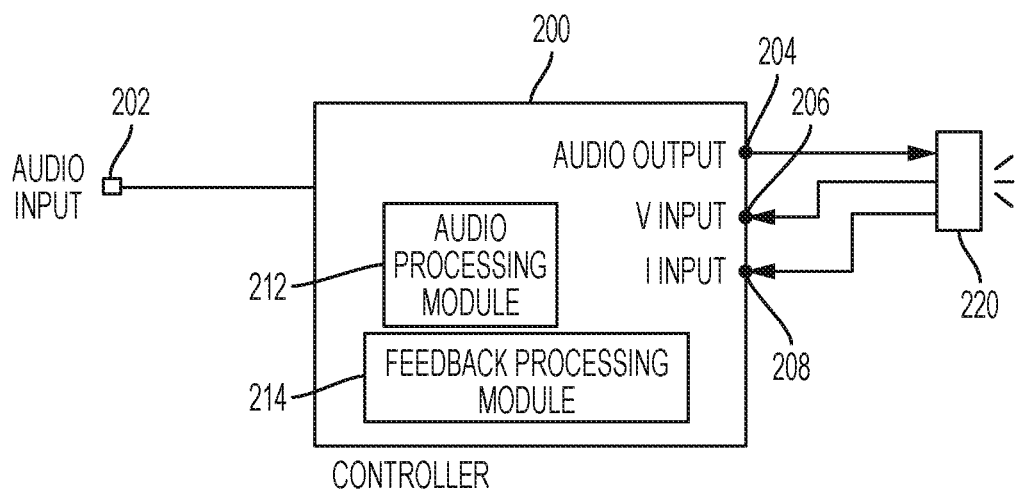
FIG. 2 is a block diagram illustrating an example apparatus for interacting with a user by detecting user input through a transducer and performing an appropriate action according to one embodiment of the disclosure.

One hardware configuration for a device that monitors the transducer is shown in FIG. 2. FIG. 2 is a block diagram illustrating an example apparatus for interacting with a user by detecting user input through a transducer and performing an appropriate action according to one embodiment of the disclosure. A controller 200 may perform audio processing for reproducing sounds at a transducer 220. For example, the controller 200 may receive audio signals in analog or digital format at audio input node 202. The controller may include an audio processing module 212 for processing the received audio signals to generate an output signal, at audio output node 204, to drive transducer 220. The processing module 212 may perform processing including converting from digital to analog and/or amplifying signals to drive transducer 220 at a desired volume. The controller 200 may be integrated with a mobile device, such as a mobile phone, tablet, entertainment device, wireless headphones, and/or a wireless speaker. The controller 200 may alternatively be integrated as part of a processor or other integrated circuit in an electronic device.

The controller 200 may receive and process feedback from the transducer 220 for determining when user input is received through the transducer 220. For example, the controller 200 may include a feedback processing module 214 that processes input received at a first feedback input node 206 and a second feedback input node 208. In some embodiments, the feedback from the transducer 220 at input nodes 206 and 208 may be received as a signal proportional to a voltage across the transducer 220 and a signal proportional to a current through the transducer 220. The voltage and/or current signals may be used by feedback processing module 214 to monitor changes in one or more characteristics of the transducer 220 and to detect changes in the characteristics that are the result of specific user interaction with the transducer 220. For example, the feedback processing module 214 may monitor a resonance frequency of the transducer 220. The resonance frequency may change when the user places a hand or other object that partially or completely covers the transducer 220. The user's hand introduces an impedance in the radiation field of the transducer 220 that alters its resonance frequency. Covering the transducer 220 may change other characteristics, such as impedance, voltage, or current, that may also or alternatively be detected by the feedback processing module 214. Further, other user actions may be detectable by monitoring the transducer 220, such as detecting when a user taps the transducer and the number of taps and force of each of the taps.

Figure 3:
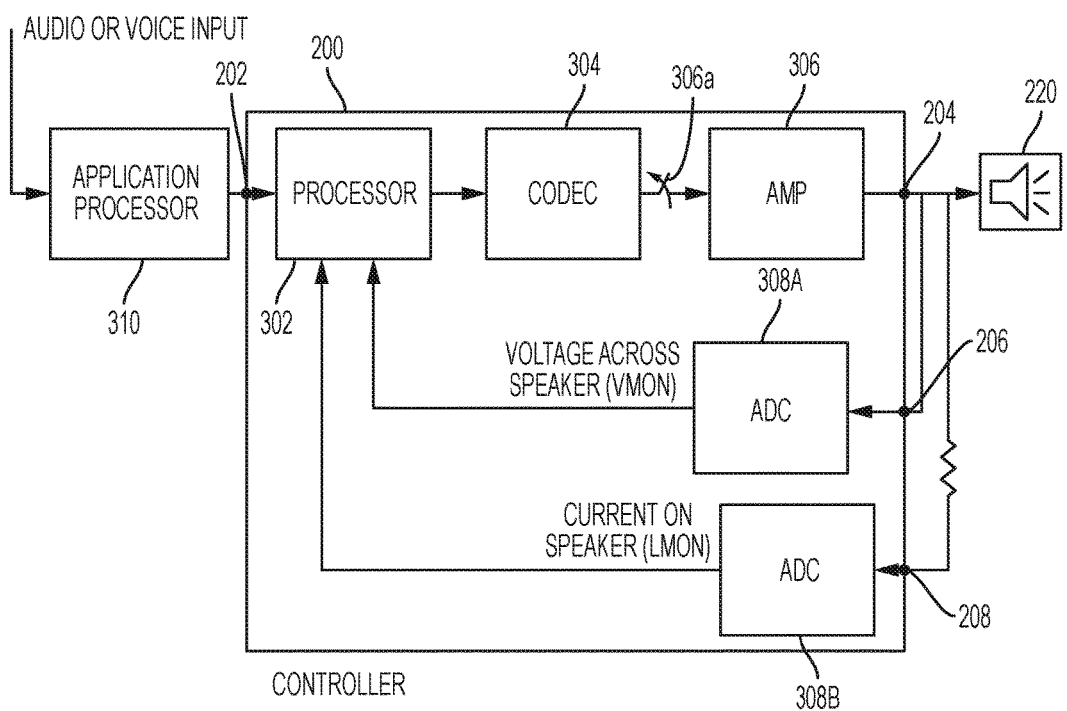
FIG. 3 is a block diagram illustrating an example apparatus using a processor that is configured to detect user input through a transducer and perform an appropriate action according to one embodiment of the disclosure.

One implementation of the controller 200 is shown in FIG. 3 as part of a system or device 300. FIG. 3 is a block diagram illustrating an example apparatus using a processor that is configured to detect user input through a transducer and perform an appropriate action according to one embodiment of the disclosure. The controller 200 may include circuitry that performs the functions of the audio processing module 212 and the feedback processing module 214. The processor 302, the coder/decoder (CODEC) 304, and the amplifier 306 may perform functions related to audio processing. The processor 302, the analog-to-digital converter (ADC) 308A, and the analog-to-digital converter (ADC) 308B may perform functions related to feedback processing. The processor 302 may be, for example, a digital signal processor (DSP), a microcontroller, an application-specific integrated circuit (ASIC), or other logic circuitry. The processor 302 may receive an audio signal from an application processor 310 that may be co-located in the electronic device with the controller 200 or integrated with the controller 200. The received audio signal may be processed by the processor 302 to prepare the signal for output to the transducer 220, such as application of equalizers, application of adaptive noise cancellation (ANC) signals, application of speaker protection algorithms, or other processing. A processed audio signal is then passed to the CODEC 304 and the amplifier 306 for output to the transducer 220. In some embodiments, a switch 306A may be located in circuitry before the audio signal reaches the amplifier 306. The switch 306A may be toggled to an open state to mute output of audio to transducer 220. In some embodiments, the amplifier 306 may be toggled on and off to mute output of audio to transducer 220 without the switch 306A.

The transducer 220 reproduces the sounds within the processed audio signals by generating pressure waves that are interpreted by users as audible sounds. The characteristics of the transducer 220 may change over time, and those changes monitored through one or more analog-to-digital converters (ADCs) 308A and 308B. The ADCs 308A-B may be coupled to the transducer 220 to receive analog signals related to the transducer 220, convert those analog signals to digital values, and provide those digital values to the processor 302. In the embodiment of FIG. 3, the ADC 308A is configured to measure a voltage across the transducer 220 and to provide the voltage as a digital value to the processor 302, and the ADC 308B is configured to measure a current through the transducer 220 using a resistor and to provide the current as a digital value to the processor 302. In other embodiments, different characteristics of the transducer 220 may be monitored and digital values generated therefrom and supplied to the processor 302.

Figure 4A:
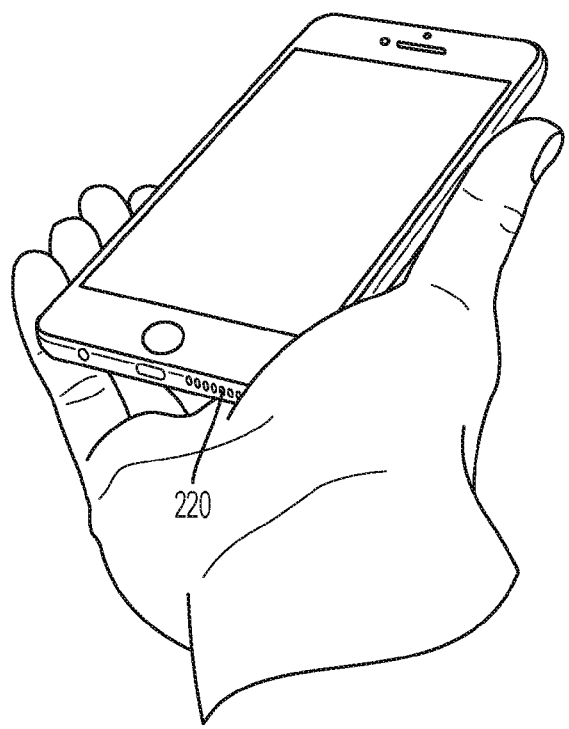
FIG. 4A is an illustration showing a user covering a transducer of a mobile phone to mute the sound according to one embodiment of the disclosure.
Figure 4B:
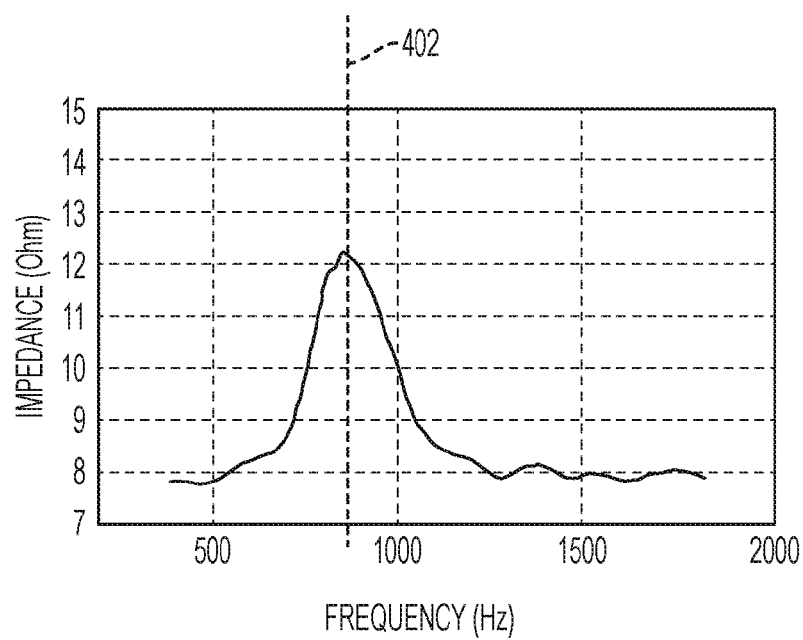
FIG. 4B is a graph illustrating an example resonance frequency for an uncovered transducer according to one embodiment of the disclosure.
Figure 4C:
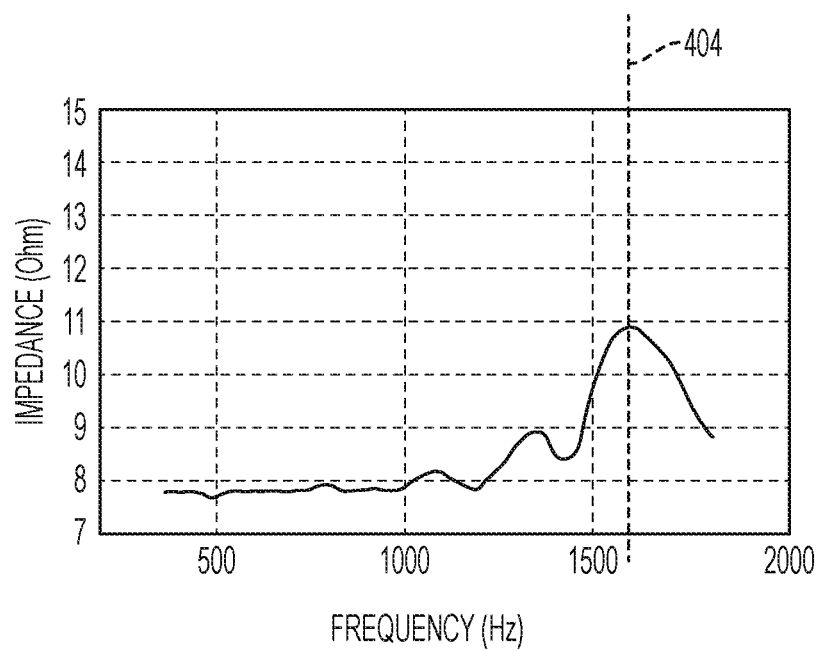
FIG. 4C is a graph illustrating an example resonance frequency for a covered transducer according to one embodiment of the disclosure.

The voltage and current values produced by ADCs 308A-B may be used by the processor 302 to determine characteristics of the transducer 220 and detect user input by identifying signatures within the changing characteristics. For example, FIG. 4A is an illustration showing a user covering a transducer of a mobile phone to mute the sound according to one embodiment of the disclosure. When the user's hand is placed over the transducer 220 to partially or completely cover the transducer, the resonance frequency of the transducer 220 may change. This change in resonance frequency may be correlated with the user's activity shown in FIG. 4A and be sufficiently unique from normal changes of the resonance frequency during operation such that the processor 302 may detect the signature of the changing resonance frequency using the digital values from ADC 308A and/or 308B. The signature may be detected by the processor 302, for example, when the resonance frequency increases more than a threshold amount and/or when the resonance frequency increases to a value over 1 kilohertz. One such change in resonance frequency is shown in the graphs of FIGS. 4B-C. FIG. 4B is a graph illustrating an example resonance frequency for an uncovered transducer according to one embodiment of the disclosure. A resonance frequency 402 of the transducer when uncovered may be below 1000 hertz, such as approximately 850 hertz. When the user partially covers the transducer, the resonance frequency may increase. FIG. 4C is a graph illustrating an example resonance frequency for a covered transducer according to one embodiment of the disclosure. A resonance frequency 404 of the transducer when covered may be above 1000 hertz, such as approximately 1650 hertz.

Figure 5:
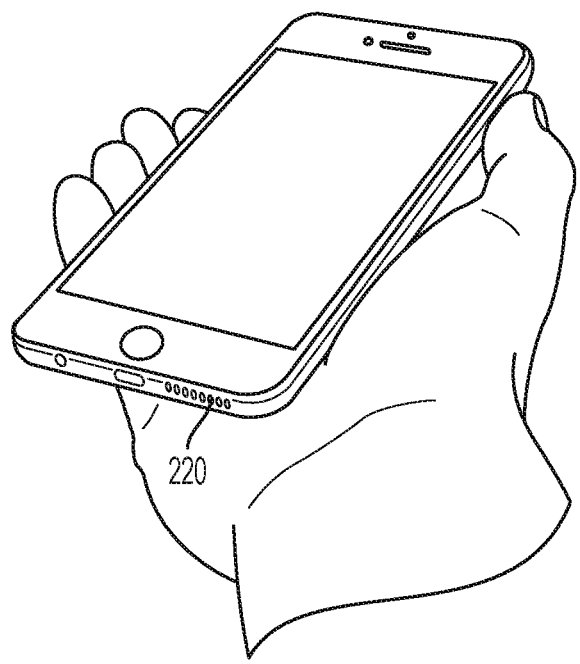
FIG. 5 is an illustration showing a user uncovering a transducer of a mobile phone to unmute the sound according to one embodiment of the disclosure.

Other actions may likewise be detected by the processor 302 by monitoring characteristics of the transducer 220 through ADCs 308A-B. For example, FIG. 5 is an illustration showing a user uncovering the transducer of the mobile phone to unmute the sound according to one embodiment of the disclosure. The uncovering may be detected by a change of the resonance frequency back from the frequency 404 of FIG. 4C to the frequency 402 of FIG. 4B. In some embodiments, the action performed when the transducer is covered is to mute the audio output. To facilitate monitoring the characteristics of the transducer 220, an inaudible signal may be applied to the transducer 220 during the time the audio is muted. For example, an ultrasonic signal may be applied to the transducer to facilitate measurement of voltage and current by the ADCs 308A-B.

Figure 6A:
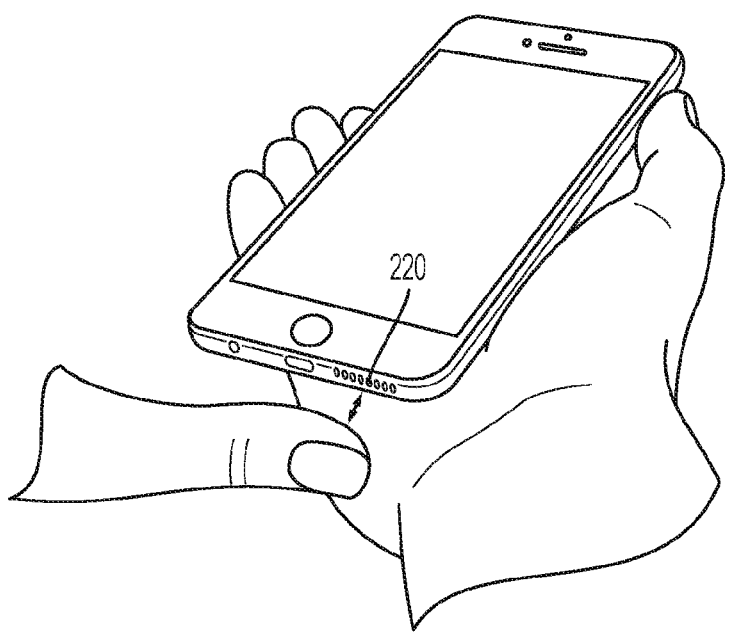
FIG. 6A is an illustration showing a user tapping the transducer of the mobile phone to unmute the sound according to one embodiment.
Figure 6B:
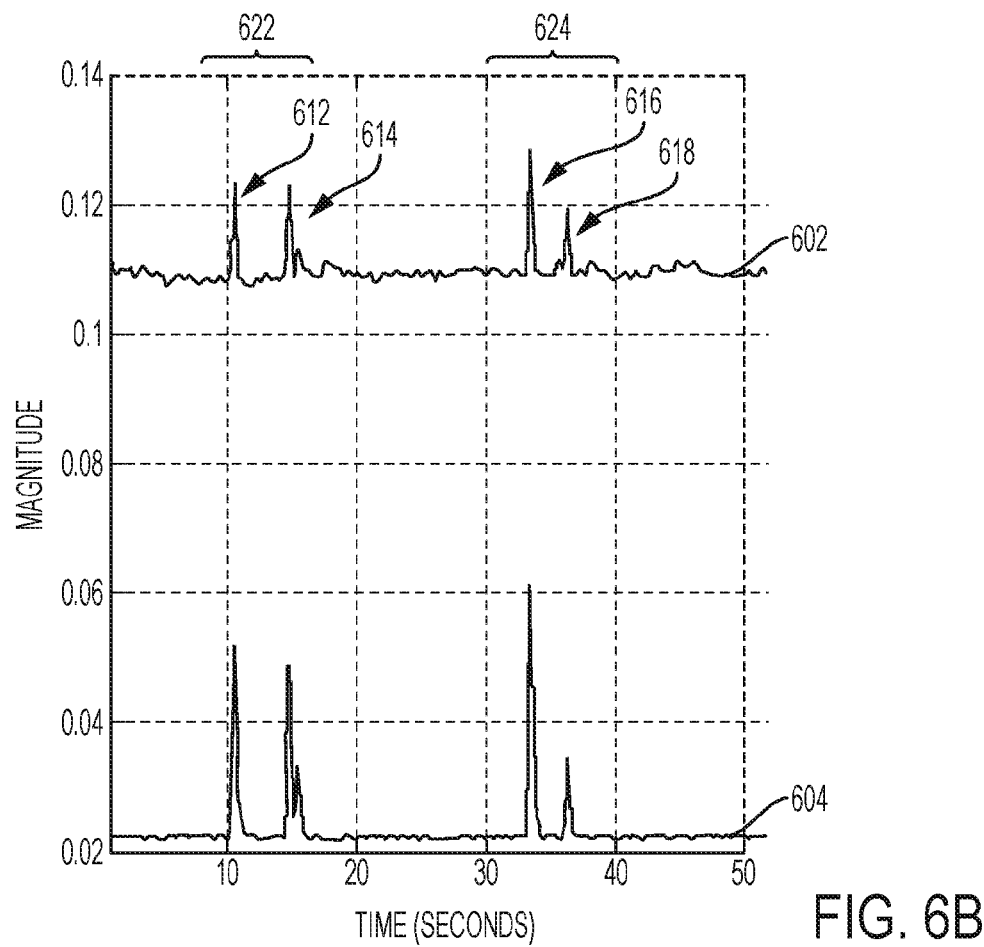
FIG. 6B is a graph illustrating example voltage and current signals for a transducer being tapped on by a user according to one embodiment of the disclosure.

Another action that may be detected by the processor 302 by monitoring characteristics of the transducer 220 through ADCs 308A-B is tapping on the transducer 220. FIG. 6A is an illustration showing a user tapping the transducer of the mobile phone to unmute the sound according to one embodiment. A tap on the transducer 220 may produce a spike in the voltage or current of the transducer 220, which may be detected by the processor 302 from the ADCs 308A-B. Examples of the signatures for taps on the transducer are shown in FIG. 6B. FIG. 6B is a graph illustrating example voltage and current signals for a transducer being tapped by a user according to one embodiment of the disclosure. A line 602 illustrates a sample voltage measurement; a line 604 illustrates a sample current measurement. Peaks for each of the lines 602 and 604 are shown at times 612, 614, 616, and 618 and correspond to a user tapping on the transducer as shown in FIG. 6A. In some embodiments, a reduction in false positives for detection of tapping may be obtained by detecting a signature of two or more taps on the transducer. The signature identified by the processor 302 may be the pattern 622 of peaks 612 and 614 or the pattern 624 of peaks 616 and 618. The signature may be detected and a corresponding command, such as unmute, is decoded by the processor 302. The processor 302 may take action to perform the action, such as to turn amplifier 306 back on. In some embodiments, the processor 302 may perform the action by relaying the decoded command to the application processor 310, where the application processor 310 executes the decoded command. In some embodiments, the number of taps and strength of the taps may be detected by the processor 302 and correspond to user input for different commands, similar to Morse code. For example, a hard tap followed by a soft tap may indicate fast forward command and a soft tap followed by a hard tap may indicate a rewind command.

The methods and apparatuses described above for detecting user input through the transducer and taking action based on the detected user input may be adapted to detect many ways for a user to interact with the device. Some detailed examples of an electronic device interacting with a user through input to the transducer are described below. However, detailed examples are only some applications of the general methods and apparatuses described above.

Figure 7:
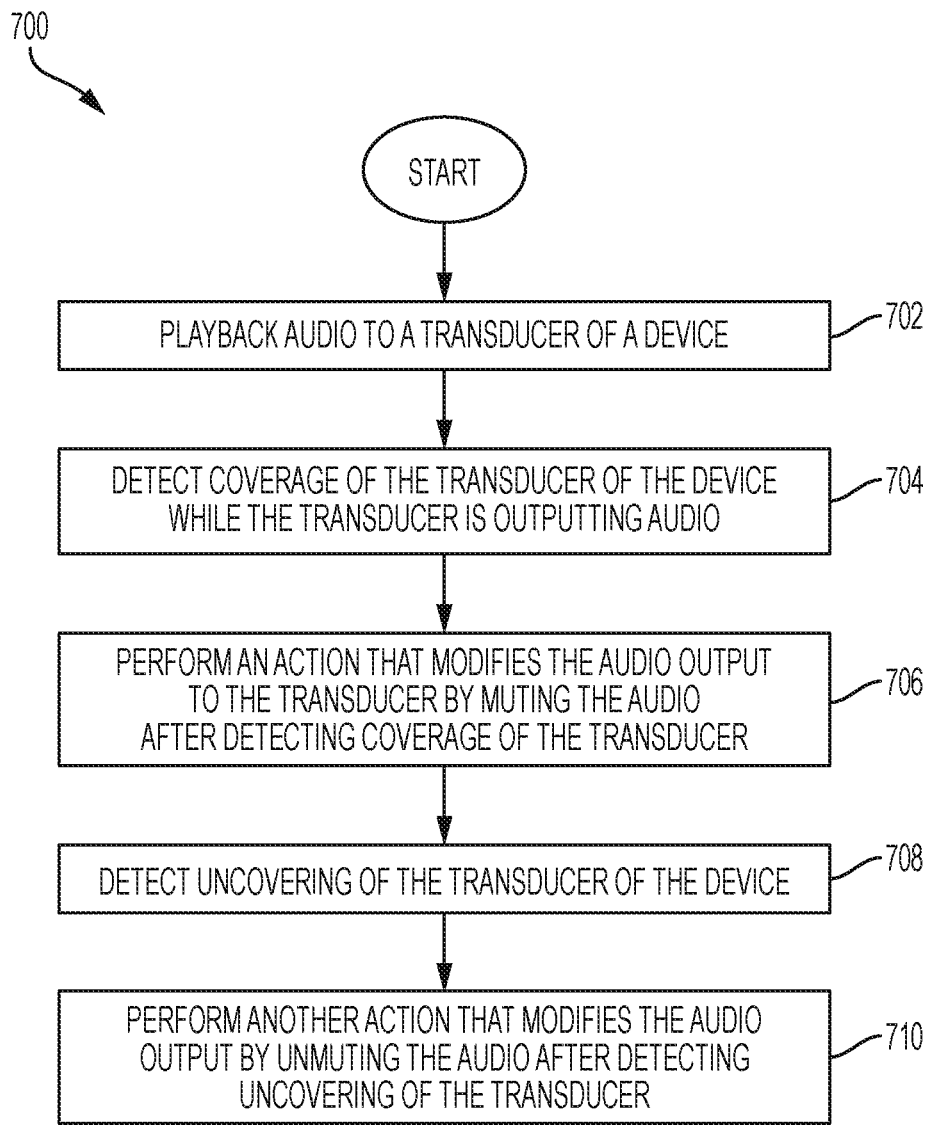
FIG. 7 is a flow chart illustrating an example method of performing actions to modify audio output to a transducer by detecting covering and uncovering of the transducer according to one embodiment of the disclosure.

In one embodiment, a user may use a first input, such as covering the transducer, to issue a first command, such as muting audio playback, and the user may use a second input, such as uncovering the transducer, to issue a second command, such as unmuting audio playback. FIG. 7 is a flow chart illustrating an example method of performing actions to modify audio output to a transducer by detecting covering and uncovering of the transducer according to one embodiment of the disclosure. A method 700 may begin at block 702 with playing back audio through a transducer of a device, such as by playing music or a telephone call to a micro speaker of a mobile device. Then, at block 704, coverage of the transducer may be detected while the transducer is outputting the audio of block 702. Detection at block 704 may include, for example, detecting a change in resonance frequency of the transducer. After coverage is detected at block 704, an action may be performed that modifies the audio output to the transducer at block 706, such as by muting the audio playback.

After a first command is received and appropriate action performed at blocks 704 and 706, the method 700 may proceed to wait to detect a second command and perform an appropriate action in response to the received second command. The second command may be paired with the first command. For example, when the first command is a mute command, the second command may be an unmute command. In another example, when the first command is a pause command, the second command may be a play command. That is, the same user input activity (e.g., changing of the resonance frequency) may designate different commands based on a past command. When the last command was mute, the device may be expecting that the next command will be unmute. At block 708, the uncovering of the transducer may be detected. Subsequently, another action may be performed that modifies the audio output at block 710, such as by unmuting the audio. The method 700 of FIG. 7 may be performed by the processor 302 of FIG. 3, the application processor 310 of FIG. 3, or other logic circuitry coupled to the transducer 220 of FIG. 3.

Figure 8:
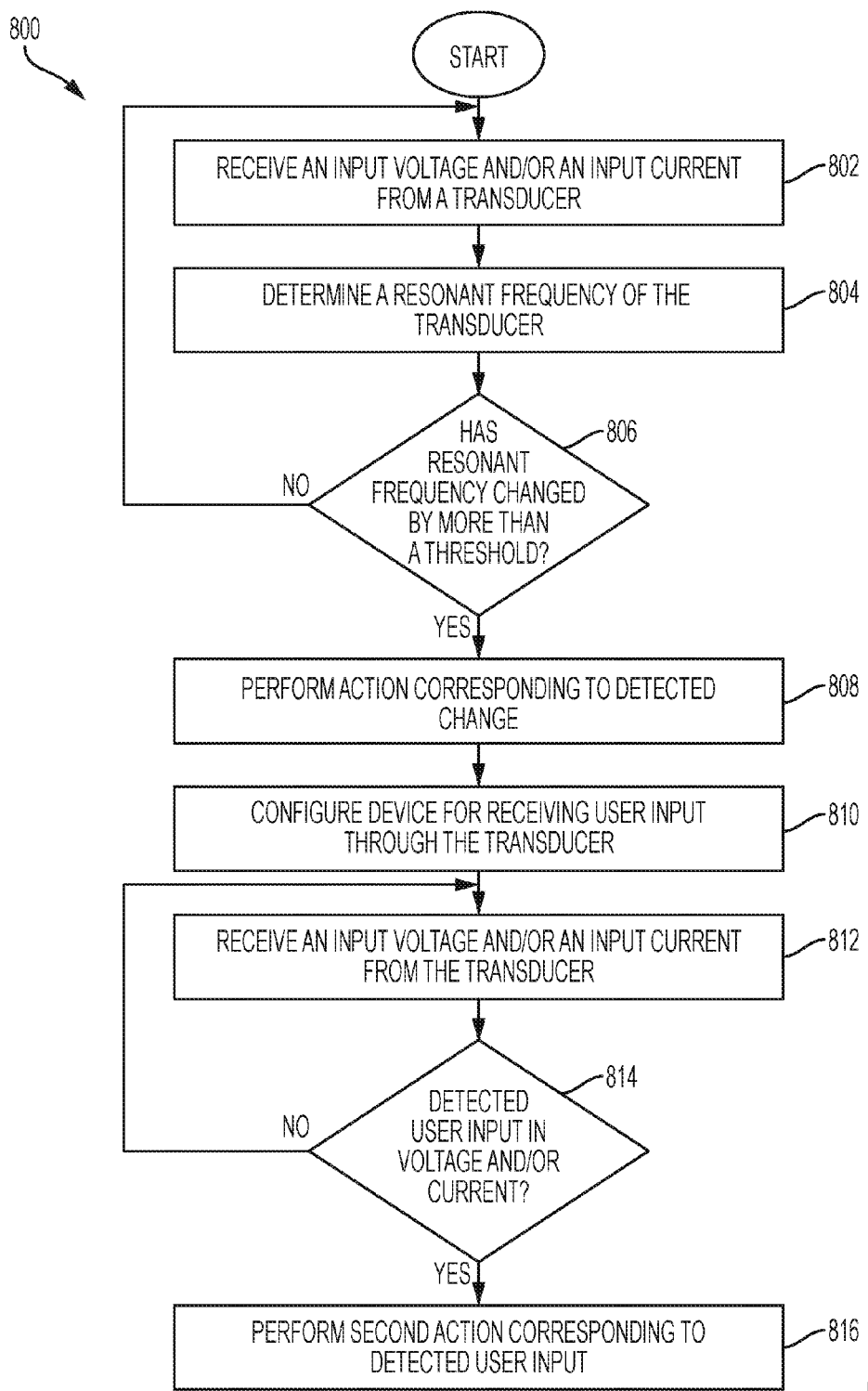
FIG. 8 is a flow chart illustrating an example method of detecting user input through a transducer by monitoring voltage and/or current levels at the transducer according to one embodiment of the disclosure.

Another example embodiment for interacting with a user by receiving input through the transducer by monitoring voltage and current at the transducer. FIG. 8 is a flow chart illustrating an example method of detecting user input through a transducer by monitoring voltage and/or current levels at the transducer according to one embodiment of the disclosure. A method 800 begins at block 802 with receiving an input voltage and/or an input current from a transducer. At block 804, a resonance frequency is determined for the transducer. At block 806, it is determined when the resonance frequency changes by more than a threshold amount. If no threshold change is detected, the method 800 returns to block 802 and continues to monitor the transducer. When the threshold change of resonance frequency occurs at block 806, the method 800 continues to block 808 to perform an action. The action may be, for example, muting the audio playback through the transducer when the resonance frequency is changed by a user covering the transducer. Although a resonance frequency is described at blocks 804 and 806, any characteristic of the transducer may be determined and examined to determine when user input is received, and that characteristic may be determined from the received voltage and/or current at block 802.

After a first command is received and appropriate action performed at blocks 806 and 808, the method 800 may proceed to wait to detect a second command and perform an appropriate action in response to the received second command. At block 810, the device is configured to receive additional user input through the transducer. For example, an ultrasonic signal may be output to the transducer to facilitate further voltage and/or current measurements from the transducer. Then, at block 812, an input voltage and/or input current are received from the transducer. It may be determined at block 814 whether a user input is detected in the received voltage and/or current of block 816. If no user input is detected, the method 800 may return to block 812 to monitor the transducer. When user input is detected, the method 800 continues to block 816 to perform a second action in response to the received second command detected at block 814. The second command may be paired with the first command. For example, when the first command is a mute command, the second command may be an unmute command. In another example, when the first command is a pause command, the second command may be a play command. Thus, at block 814, the uncovering of the transducer may be detected. Subsequently, another action may be performed that modifies the audio output at block 816, such as by unmuting the audio. The method 800 of FIG. 8 may be performed by the processor 302 of FIG. 3, the application processor 310 of FIG. 3, or other logic circuitry coupled to the transducer 220 of FIG. 3.

Embodiments of the invention described above allow a user to interact with an electronic device through devices that have conventionally been limited to providing outputs. These embodiments and other embodiments of the invention may provide for thinner and lighter devices by reducing or eliminating a need for additional physical switches or other components. Further, these and other embodiments may reduce power consumption on the device by reducing the amount of time a user is interacting with a power-consuming touchscreen display. Monitoring a speaker for detecting changes in characteristics that indicate user input is described above, however other components could also be monitored. In some embodiments, the circuitry for monitoring the speaker may be shared with other functionality on the device to reduce any additional cost or size in the electronic device. For example, the circuitry for monitoring the speaker may be used for speaker protection in addition to detecting user input through the speaker. Thus, the manners of receiving user input through a speaker or other monitored component as described above may have many advantages for an electronic device, and particularly for a mobile device, such as a mobile phone, tablet, laptop computer, or portable entertainment device.

The schematic flow chart diagrams of FIG. 1, FIG. 7, and FIG. 8 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although analog-to-digital converters (ADCs) are described throughout the detailed description, aspects of the invention may be applied to the design of other converters, such as digital-to-analog converters (DACs) and digital-to-digital converters, or other circuitry and components based on delta-sigma modulation. As another example, although digital signal processors (DSPs) are described throughout the detailed description, aspects of the invention may be applied to the design of other processors, such as graphics processing units (GPUs) and central processing units (CPUs). Further, although ones (1s) and zeros (0s) or highs and lows are given as example bit values throughout the description, the function of ones and zeros may be reversed without change in operation of the processor described in embodiments above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   detecting first user input through a transducer of a device by monitoring a characteristic of the transducer while the transducer is outputting audio based on a first current signal, the characteristic being measured by monitoring a voltage across the transducer using the first current signal output to the transducer for outputting the audio;

performing a first action that modifies the audio being output through the transducer based, at least in part, on detecting the first user input through the transducer, the first action stopping the first current signal to mute the audio;

outputting inaudible signals to the transducer after performing the first action that mutes the audio, wherein the step of outputting inaudible signals comprises outputting a second current signal to the transducer to allow for measuring of the voltage across the transducer;

detecting a second user input through the transducer while outputting the inaudible signals, wherein the second user input indicates a second action to be performed to modify the audio being output through the transducer to unmute the audio, the second user input detected by measuring the voltage across the transducer using the second current signal output to the transducer to identify at least one tap on the transducer that modifies the voltage across the transducer; and performing the second action to modify the audio being output through the transducer to unmute the audio based, at least in part, on detecting the second user input.

2. The method of claim 1, wherein the step of monitoring the characteristic comprises monitoring at least one of a voltage across the transducer and a current through the transducer.

3. The method of claim 1, wherein the step of detecting the first user input comprises detecting at least partial coverage of the transducer, and wherein the step of monitoring the characteristic comprises monitoring a resonance frequency of the transducer.

4. The method of claim 3, wherein the step of detecting the at least partial coverage of the transducer comprises monitoring the resonance frequency of the transducer for an increase in resonance frequency by at least a threshold amount.

5. The method of claim 3, wherein the transducer comprises a micro speaker, and wherein the step of detecting the at least partial coverage of the transducer comprises monitoring the resonance frequency of the transducer for an increase in resonance frequency to above 1 kilohertz.

6. The method of claim 1, wherein the step of detecting the second user input comprises detecting a double-tap on the transducer, wherein the double-tap changes at least one of a voltage across the transducer and a current through the transducer.

7. The method of claim 1, wherein the step of detecting the second user input comprises detecting an uncovering of the transducer.

8. An apparatus, comprising:
a controller coupled to a transducer and configured to perform steps comprising:
detecting first user input through a transducer of a device by monitoring a characteristic of the transducer while the transducer is outputting audio based on a first current signal, the characteristic being measured by monitoring a voltage across the transducer using the first current signal output to the transducer for outputting the audio;
performing a first action that modifies the audio being output through the transducer based, at least in part, on detecting the first user input through the transducer, the first action stopping the first current signal to mute the audio;
outputting inaudible signals to the transducer after performing the first action that mutes the audio, wherein the step of outputting inaudible signals comprises outputting a second current signal to the transducer to allow for measuring of the voltage across the transducer;
detecting a second user input through the transducer while outputting the inaudible signals, wherein the second user input indicates a second action to be performed to modify the audio being output through the transducer to unmute the audio,
the second user input detected by measuring the voltage across the transducer using the second current signal output to the transducer to identify at least one tap on the transducer that modifies the voltage across the transducer; and
performing the second action to modify the audio being output through the transducer to unmute the audio based, at least in part, on detecting the second user input.

9. The apparatus of claim 8, wherein the step of monitoring the characteristic comprises monitoring at least one of a voltage across the transducer and a current through the transducer.

10. The apparatus of claim 8, wherein the step of detecting the first user input comprises detecting at least partial coverage of the transducer, and wherein the step of monitoring the characteristic comprises monitoring a resonance frequency of the transducer.

11. The apparatus of claim 10, wherein the step of detecting the at least partial coverage of the transducer comprises monitoring the resonance frequency of the transducer for an increase in resonance frequency by at least a threshold amount.

12. The apparatus of claim 10, wherein the transducer comprises a micro speaker, and wherein the step of detecting the at least partial coverage of the transducer comprises monitoring the resonance frequency of the transducer for an increase in resonance frequency to above 1 kilohertz.

13. The apparatus of claim 8, wherein the step of detecting the second user input comprises detecting a double-tap on the transducer, wherein the double-tap changes at least one of a voltage across the transducer and a current through the transducer.

14. The apparatus of claim 8, wherein the step of detecting the second user input comprises detecting an uncovering of the transducer.

15. An apparatus, comprising:
a transducer;
at least one analog-to-digital converter (ADC) coupled to the transducer;
a processor coupled to the transducer and coupled to the at least one analog-to-digital converter (ADC) and configured to perform steps comprising:
receiving first data regarding the transducer from the at least one analog-to-digital converter (ADC);
detecting first user input through a transducer of a device by monitoring a characteristic of the transducer determined based, at least in part, on the first data while the transducer is outputting audio based on a first current signal, the characteristic being measured by monitoring a voltage across the transducer using the first current signal output to the transducer for outputting the audio;
performing a first action that modifies the audio being output through the transducer based, at least in part, on detecting the first user input through the transducer, the first action stopping the first current signal to mute the audio;

outputting inaudible signals to the transducer after performing the first action that mutes the audio, wherein the step of outputting inaudible signals comprises outputting a second current signal to the transducer to allow for measuring of the voltage across the transducer;

receiving second data regarding the transducer from the at least one analog-to-digital converter (ADC);

detecting a second user input through the transducer while outputting the inaudible signals by monitoring the characteristic of the transducer determined based, at least in part, on the second data, wherein the second user input indicates a second action to be performed to modify the audio being output through the transducer to unmute the audio, the second user input detected by measuring the voltage across the transducer using the second current signal output to the transducer to identify at least one tap on the transducer that modifies the voltage across the transducer; and performing the second action to modify the audio being output through the transducer to unmute the audio based, at least in part, on detecting the second user input.

16. The apparatus of claim 15, further comprising an amplifier coupled to the processor and to the transducer, wherein the step of performing the first action comprises muting the amplifier.

17. The apparatus of claim 15, further comprising a switch coupled to the processor and to the transducer, wherein the step of performing the first action comprises de-activating the switch to mute the audio.

18. The apparatus of claim 15, wherein the at least one analog-to-digital converter (ADC) is configured to convert at least one of an analog current value and an analog voltage value to a digital value, and wherein the processor is configured to receive the converted digital value and to calculate the characteristic of the transducer based, at least in part, on the digital value.

19. The apparatus of claim 15, wherein the transducer comprises a micro speaker, and wherein the processor is configured to detect the first user input by detecting at least partial coverage of the transducer by determining that a resonance frequency of the micro speaker is above a threshold value.

20. The apparatus of claim 15, wherein the step of detecting the second user input comprises detecting a double-tap on the transducer, wherein the double-tap changes at least one of a voltage across the transducer and a current through the transducer.

21. The apparatus of claim 15, wherein the step of detecting the second user input comprises detecting an uncovering of the transducer.

* * * * *